(12) United States Patent
Bates et al.

(10) Patent No.: US 11,865,430 B1
(45) Date of Patent: Jan. 9, 2024

(54) SCOREBOARD DATA ADAPTER SYSTEM AND METHOD

(71) Applicant: Major Display, Inc., Franklin, NC (US)

(72) Inventors: Michael C. Bates, Franklin, NC (US); Glen M. Whittaker, Franklin, NC (US)

(73) Assignee: Major Display, Inc., Franklin, NC (US)

( * ) Notice: Subject to any disclaimer, the term of this patent is extended or adjusted under 35 U.S.C. 154(b) by 0 days.

(21) Appl. No.: 15/972,603

(22) Filed: May 7, 2018

Related U.S. Application Data

(60) Provisional application No. 62/502,028, filed on May 5, 2017.

(51) Int. Cl.
| | | |
|---|---|---|
| G06F 3/0484 | (2022.01) |
| A63B 71/06 | (2006.01) |
| H04L 9/40 | (2022.01) |
| H04W 4/02 | (2018.01) |
| G06F 16/955 | (2019.01) |
| H04W 4/80 | (2018.01) |

(52) U.S. Cl.
CPC ........ A63B 71/0669 (2013.01); G06F 3/0484 (2013.01); G06F 16/9566 (2019.01); H04L 63/0876 (2013.01); H04W 4/023 (2013.01); H04W 4/80 (2018.02)

(58) Field of Classification Search
CPC ............. A63B 71/0669; G06F 16/9566; G06F 3/0484; H04L 63/0876
See application file for complete search history.

(56) References Cited

U.S. PATENT DOCUMENTS

| | | |
|---|---|---|
| 5,557,717 A | 9/1996 | Wayner |
| 5,898,587 A | 4/1999 | Bell et al. |
| 6,052,054 A | 4/2000 | Hampson et al. |
| 6,516,135 B1 | 2/2003 | Higuchi et al. |
| 6,944,509 B2 | 9/2005 | Altmaier et al. |
| 6,980,113 B1 | 12/2005 | Uehran |
| 7,394,348 B2 | 7/2008 | Roeske |
| 7,515,136 B1 * | 4/2009 | Kanevsky .......... G06Q 30/0267 345/156 |
| 7,679,487 B1 | 3/2010 | Smith et al. |

(Continued)

*Primary Examiner* — Phenuel S Salomon
(74) *Attorney, Agent, or Firm* — The Van Winkle Law Firm; William G. Heedy; Sam Ferrell Alman, Jr.

(57) ABSTRACT

A scoreboard control system is provided for enabling web-based access and real-time control of a scoreboard display associated with a particular venue, by users that can use their personal computing devices. The scoreboard is provided with a scoreboard computer adapter, operatively connected to a hosted web application server. The web server may send messages to specified users prompting them to access the system, or may passively receive messages from users seeking access rights to operate the scoreboard. The web server, upon authenticating an end user computing device with respect to the venue and a specified event, generates a web interface on the end user device display that is customized with respect to an associated scoreboard profile, and transmits scoreboard commands received via the web interface to the scoreboard computer adapter. The adapter directs updating of the display in accordance with the respective scoreboard commands and in real time.

10 Claims, 3 Drawing Sheets

(56) References Cited

U.S. PATENT DOCUMENTS

| | | | | |
|---|---|---|---|---|
| 7,898,393 B2 * | 3/2011 | McMillan | | A63B 71/06 |
| | | | | 463/3 |
| 7,909,332 B2 * | 3/2011 | Root | | G07F 17/3288 |
| | | | | 273/459 |
| 8,066,572 B1 | 11/2011 | Timmons et al. | | |
| 8,531,462 B1 | 9/2013 | Tillman et al. | | |
| 9,283,467 B1 | 3/2016 | Moore et al. | | |
| 9,881,433 B2 * | 1/2018 | Bergdale | | G07C 9/29 |
| 10,702,771 B2 * | 7/2020 | Miller | | A63F 13/26 |
| 2002/0138163 A1 * | 9/2002 | MacPherson | | G06F 16/954 |
| | | | | 700/92 |
| 2003/0054794 A1 * | 3/2003 | Zhang | | H04W 88/04 |
| | | | | 455/403 |
| 2004/0166966 A1 | 8/2004 | Nielsen | | |
| 2005/0021393 A1 * | 1/2005 | Bao | | H04L 29/06 |
| | | | | 705/14.64 |
| 2008/0189371 A1 * | 8/2008 | Shaffer | | G06Q 10/10 |
| | | | | 709/206 |
| 2009/0276292 A1 * | 11/2009 | Inselberg | | G06Q 30/0258 |
| | | | | 455/517 |
| 2010/0123668 A1 * | 5/2010 | Kuhn | | G06F 3/0488 |
| | | | | 345/173 |
| 2011/0119743 A1 * | 5/2011 | Gleim | | H04L 63/107 |
| | | | | 726/6 |
| 2011/0173041 A1 * | 7/2011 | Breitenbach | | G06Q 30/0277 |
| | | | | 705/7.13 |
| 2012/0256373 A1 | 10/2012 | Tam et al. | | |
| 2013/0073389 A1 * | 3/2013 | Heath | | G06Q 50/01 |
| | | | | 705/14.54 |
| 2013/0120123 A1 * | 5/2013 | Aman | | G09F 9/301 |
| | | | | 340/323 R |
| 2013/0143651 A1 * | 6/2013 | Harrison | | H04N 21/4222 |
| | | | | 463/31 |
| 2013/0298053 A1 * | 11/2013 | Sprang | | G06F 8/34 |
| | | | | 715/765 |
| 2014/0067947 A1 * | 3/2014 | Archibong | | H04L 61/6022 |
| | | | | 709/204 |
| 2014/0258280 A1 * | 9/2014 | Wilson | | G06F 16/29 |
| | | | | 707/724 |
| 2014/0379868 A1 * | 12/2014 | Nault | | H04L 67/06 |
| | | | | 709/219 |
| 2015/0217179 A1 * | 8/2015 | Olsson | | A63B 71/0616 |
| | | | | 700/91 |
| 2015/0358680 A1 * | 12/2015 | Feldstein | | H04N 21/478 |
| | | | | 725/43 |
| 2016/0045811 A1 * | 2/2016 | Klein | | A63B 71/0622 |
| | | | | 340/323 R |
| 2016/0189062 A1 * | 6/2016 | Forss | | G06Q 10/02 |
| | | | | 705/5 |
| 2016/0213995 A1 * | 7/2016 | Huebsch | | G06F 16/22 |
| 2016/0277812 A1 * | 9/2016 | Bokowski | | H04N 21/812 |
| 2016/0309304 A1 * | 10/2016 | Subramanian | | G01C 21/206 |
| 2017/0099363 A1 | 4/2017 | Baldyga et al. | | |
| 2017/0311361 A1 * | 10/2017 | Granbery | | H04W 8/005 |
| 2018/0124438 A1 * | 5/2018 | Barnett | | H04N 21/23424 |

\* cited by examiner

SCOREBOARD DATA ADAPTER SYSTEM AND METHOD

CROSS-REFERENCES TO RELATED APPLICATIONS

This application claims benefit of U.S. Provisional Patent Application No. 62/502,028, filed May 5, 2017, and which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present invention relates generally to electronic scoreboards for live events and user controls for displays thereof. More particularly, the present invention relates to a web-based system and method for enabling real-time control by a user of a scoreboard display using virtually any end user computing device.

Computerized scoreboard displays for sporting and gaming events have evolved considerably over time to incorporate the latest and greatest display technologies, but the fundamental hardware behind the scoreboard system itself has remained relatively unchanged. Whether connecting to a full-panel, jumbotron-style LED video board or a traditional, electro-mechanical incandescent bulb display, scoreboards are maintained via discreet and proprietary controller systems or consoles. These hardware controllers are generally proprietary in nature and require user training based on the individual make and model of the scoreboard system employed. They also represent an added expense to venues who must pay for both the display board and the controller, which are often not interchangeable.

Traditional scoreboard systems have required a hardwired, electrical connection between the scoreboard and a controller for updating information on the display board. These systems demand expensive wiring components that also limit placement of the controller within the venue. Newer versions of scoreboard systems have substituted a physical, hard-wired connection for wireless communications between the controller and display board. Wireless connections have provided more flexibility regarding placement of the controller and reducing cost, but newer scoreboard systems still rely on a physical, proprietary controller, adding expensive hardware which much be purchased and maintained. This added expense creates a significant burden for smaller sports arenas such as middle schools and high schools which may not have a discretionary budget large enough to afford purchasing, maintaining, and replacing proprietary hardware.

Further, the proprietary nature of controllers mean that the controllers are not interchangeable with other scoreboard systems. This may prove challenging for scorekeepers who must operate at different venues operating different scoreboard systems, as they now must learn new scoreboard controller configurations and are limited to the deployment and setup for the venue. This increases learning time and can result in errors or delay in operation that detract from the sports entertainment experience.

More recently, scoreboard controllers have been provided in the form of mobile tablet computers or other computing devices that can be carried by the user to various locations in a given venue or at least within operable range of the associated scoreboard. Such systems enable a certain amount of administrative flexibility in that a number of like computing devices can be provided and simply programmed separately for use with specific scoreboards or venues. However, these systems can logistically be difficult for users, particularly where a different user will be requiring use of the device for each successive event, which may take place immediately after the preceding event. Users may be relatively unfamiliar with the hardware or the resident software application, and the communal hardware may further be subject to a great deal of wear and tear due to usage by a large number of users.

BRIEF SUMMARY

Accordingly, and compared to previous scoreboard systems, a scoreboard system and method utilizing a hardware control board unit and configurable web application software, capable of connecting to a smartphone or wirelessly enabled computer device, permits users to use the smartphone or computer device as a scoreboard controller, eliminating the need for a proprietary wireless controller. Moreover, the modular nature of the web application software permits users to set up personalized scoreboard layouts in various configurations accounting for user preference. The hardware control board may be integrated into the scoreboard or may integrate into the input/output socket of the scoreboard and configured to receive and send scoreboard commands. The hardware unit may contain multiple scoreboard profiles, making it compatible with various makes and models. The control board may further contain wireless access point hardware capable of broadcasting its own network, allowing Wi-Fi enabled devices to connect to it without requiring the presence of a wireless, Internet-enabled network within the venue.

In an embodiment, the scoreboard system may comprise a standalone or integrated computer hardware unit with for example a Wi-Fi radio or Ethernet/physical network to broadcast a wireless network signal and an input/output connector for interfacing with a wired or wireless scoreboard unit. The computer hardware unit broadcasts a wireless network signal to which a wireless computer device such as a smartphone can connect, such as via an IPv4 or IPv6 address. In one embodiment, the computer hardware unit may be associated with one or more unique URLs such that a user who connects to the unit's wireless network and enters an associated URL may be able to interact with the device via the user's connected device. Various URLs may be associated with various user access rights or scoreboard configurations. The device may further permit multiple devices to connect to and interact with it wirelessly.

In various embodiments, the computer hardware unit contains a web application server configured to spool a scalable web interface to connected devices. In certain embodiments, the server may only allow authenticated devices to receive the web interface. For example, the server may authenticate users on the basis of a username and password, the connecting device's MAC address, an RSA token, scanning of an NFC chip, and other access verification methods. The server then spools a scalable web interface to the connected client device, the web interface populated with scoreboard controls.

A user may then use his or her connected client device to perform scorekeeping operations via the web interface. When the user issues scorekeeping commands via the web interface, the device interprets the issued command and generates an associated output function via the wired or wireless I/O port for the scoreboard unit, thereby causing the scoreboard unit to receive the scorekeeping command intent and perform the command function. In an embodiment, the device may further contain a scorekeeping engine operated in background, as a second application, or as an entirely separate program, etc., where user-issued commands additionally generate an associated function on a software scoreboard. For example, if a user issues a command to increase the home team's score by three points, the device may determine the appropriate "+3 HOME SCORE" command for the connected scoreboard unit, based on the units make and model, issue the appropriate command to the connected scoreboard unit, and add three points to the home team on the software scoreboard. As such, the software scoreboard and scoreboard unit are maintained in parallel and retain the same effective score information based on the user's commands.

In a particular embodiment as disclosed herein, a web-based scoreboard control system includes a scoreboard computer adapter in operable association with a scoreboard having a display and associated with a particular venue. A hosted web application server is communicatively connected to the scoreboard computer adapter and configured, upon authenticating an end user computing device with respect to the venue and a specified event, to generate a web interface for the end user computing device that is customized with respect to a profile of the associated scoreboard, and to transmit scoreboard commands received via the web interface to the scoreboard computer adapter. The scoreboard computer adapter is further configured responsive to the transmitted scoreboard commands to direct updating of the display in accordance with the respective scoreboard commands.

In one exemplary aspect of the aforementioned embodiment, one or more location- based token generators are further located proximate the particular venue, and configured to provide at least a location token to a proximate end user computing device for authenticating access to the web application server.

The location token may comprise an identifier for the particular scoreboard associated with the venue.

A plurality of scoreboards may be associated with the particular venue, wherein the location token comprises an identifier for any one or more of the plurality of scoreboards.

The one or more location-based token generators may comprise at least one QR code configured upon scanning by an end user computing device to provide a location token comprising a URL having at least a domain associated with the hosted web server and an appended location identifier.

Alternatively, the one or more location-based token generators may comprise devices (for example, NFC tags) configured to broadcast to one or more proximate end user computing devices a location token comprising a URL having at least a domain associated with the hosted web server and an appended location identifier.

In another exemplary aspect of the aforementioned embodiment, a hosted mobile software application may reside on the end user computing device and be configured upon receiving the location token to generate a message to the URL domain including the location token and further appending an identity token.

In another exemplary aspect of the aforementioned embodiment, one or more sensors are communicatively linked to the scoreboard computer adapter and configured to automatically generate output signals representative of a scoring increment trigger, wherein the scoreboard computer adapter is configured to automatically update the scoreboard display or to prompt the end user computing device for authentication of an update to the scoreboard display.

In another exemplary aspect of the aforementioned embodiment, the web server is configured to generate a graphical web interface for the end user computing device that is customized with respect to a predetermined set of inputs and/or outputs available for the specified event. The graphical web interface for the end user computing device may further limit access to one or more of the predetermined set of inputs and/or outputs based on an authentication level of the respective end user.

In another exemplary aspect of the aforementioned embodiment, the hosted web server may be configured to generate a first graphical web interface for a first end user computing device and a second graphical web interface for a second end user computing device, wherein the first and second graphical web interfaces are respectively customized for first and second sets of inputs and/or outputs available for the specified event.

In another exemplary aspect of the aforementioned embodiment, the scoreboard computer adapter may include a gateway device having a processor, memory and one or more input/output interfaces coupled to respective input/output interfaces for the scoreboard. Alternatively, the scoreboard computer adapter may include a processor and memory residing in a housing for the scoreboard and in operative association with the scoreboard display.

In another exemplary aspect of the aforementioned embodiment, the hosted web server may be configured to deliver messages to one or more defined users with respect to the specified event, prompting each of the one or more defined users to initiate location-based authentication for access to the web interface.

DETAILED DESCRIPTION

Figure 1:
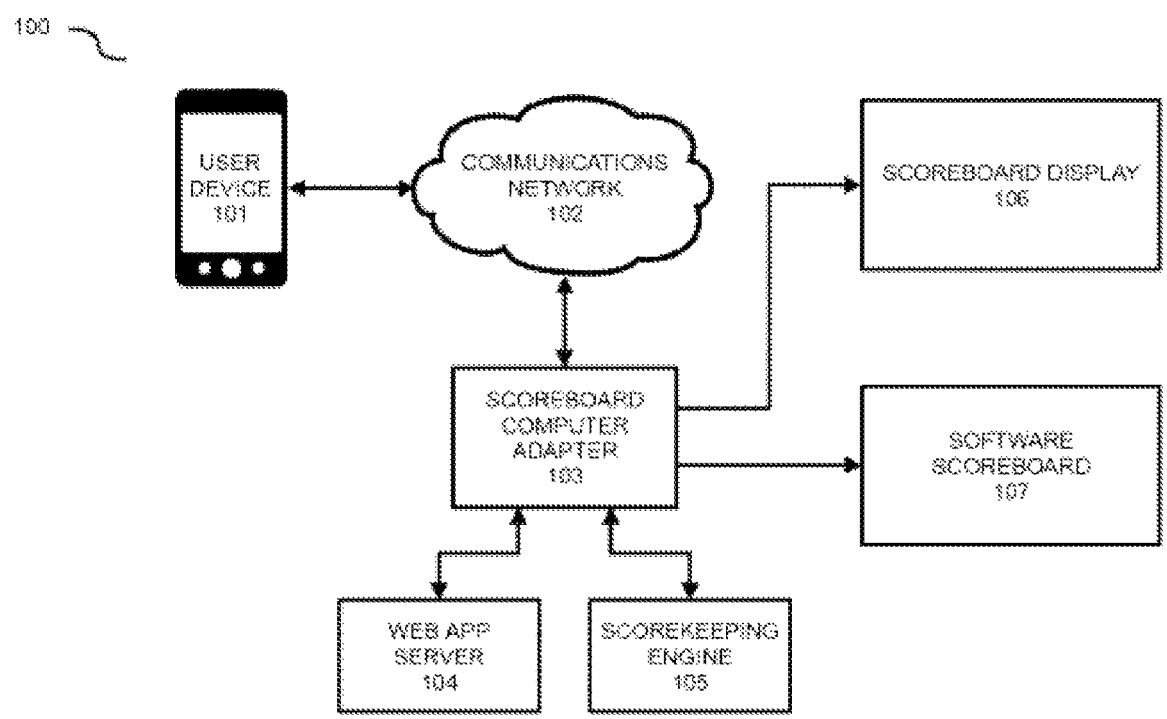
FIG. 1 is a block diagram representing an embodiment of the system and method as disclosed herein.
Figure 2:
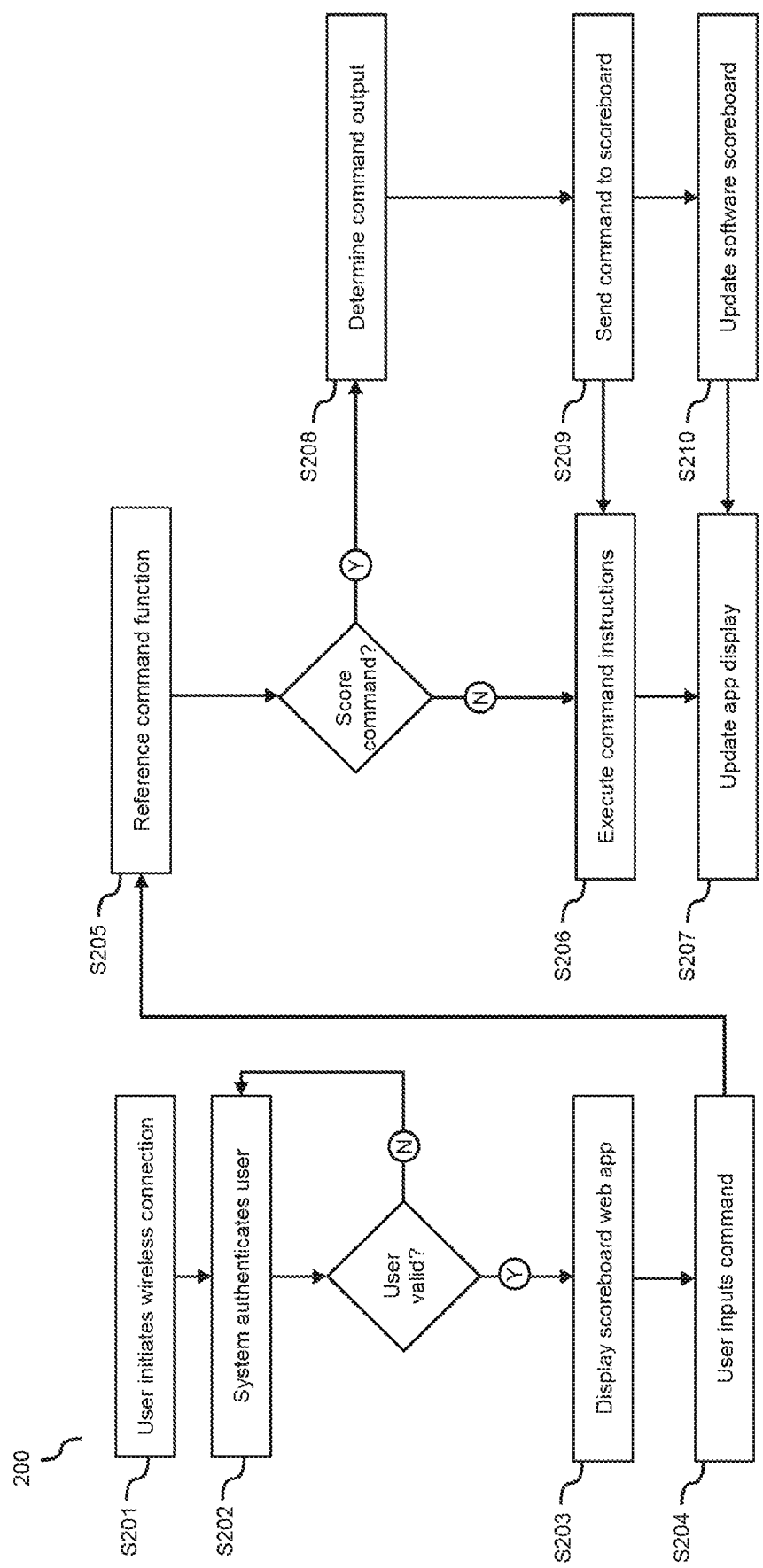
FIG. 2 is a flowchart representing various steps in at least one embodiment of a scoreboard interface method as disclosed herein.
Figure 3:
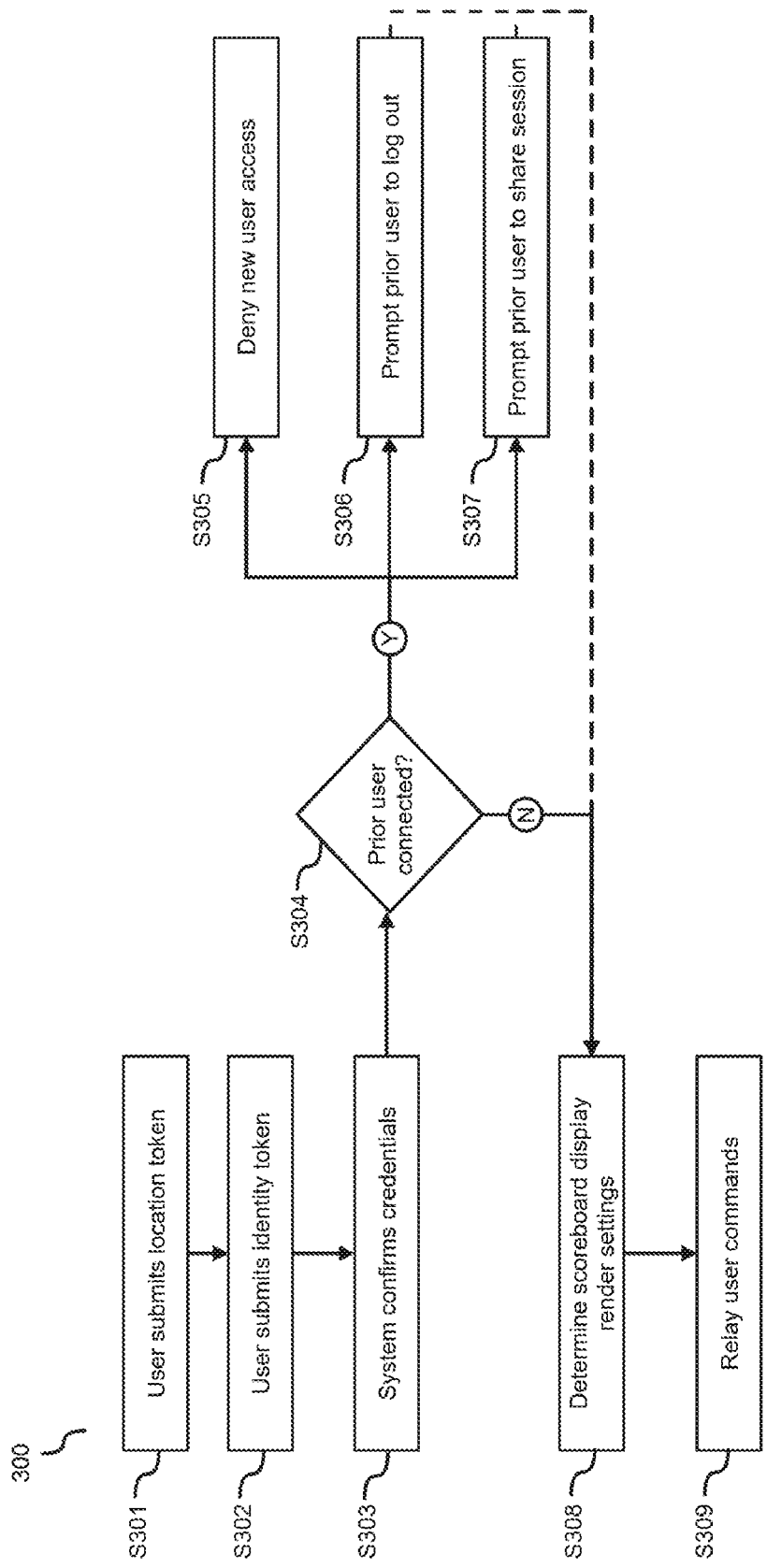
FIG. 3 is a flowchart representing various steps in at least one embodiment of a user authentication method as disclosed herein.

Referring generally to FIGS. 1-3, various exemplary embodiments of an invention may now be described in detail. Where the various figures may describe embodiments sharing various common elements and features with other embodiments, similar elements and features are given the same reference numerals and redundant description thereof may be omitted below.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrases "in an embodiment" and "in one embodiment," as used herein does not necessarily refer to the same embodiment, although it may.

Depending on the embodiment, certain acts, events, or functions of any of the algorithms described herein can be performed in a different sequence, can be added, merged, or left out altogether (e.g., not all described acts or events are necessary for the practice of the algorithm) Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may,""e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "communications network" as used herein with respect to data communication between two or more parties or otherwise between communications network interfaces associated with two or more parties may refer to any one of, or a combination of any two or more of: telecommunications networks (whether wired, wireless, cellular or the like), local networks, network links, Internet Service Providers (ISPs), and intermediate communication interfaces; but typically not including or at least not requiring a global network such as the Internet.

Referring to FIG. 1, an exemplary embodiment of a data adapter system 100 as disclosed herein for updating a display such as for example a scoreboard may include an end user computing device 101 such as a smartphone, tablet, laptop, and the like. The end user computing device 101 may generally but not necessarily be mobile in nature and wirelessly enabled. The end user computing device may connect to a communications network 102 generated by a scoreboard computer adapter 103. The scoreboard computer adapter 103 may comprise a web application server 104 configured to spool, serve, and display a scalable and interactive web interface upon the connected mobile user device 101. In an embodiment, the web application server 104 or scoreboard computer adapter 103 may first authenticate the connected mobile user device 101 before serving the web interface to the mobile user device 101.

In various embodiments, user device authentication may require the presence of both an identity token and a location token to verify the user, as further described in FIG. 3 herein. The location token may generally be described as a fixed or location-centric token for uniquely identifying a scoreboard, and the identity token may be generally described as a verifying credential for a specific user. In said embodiments, the user must provide both tokens to prove (1) that the user is on site and proximate to the scoreboard for purposes of operating it and (2) that the user is authorized to operate the scoreboard.

In one embodiment, the scoreboard computer adapter 103 and web application server 104 may be independent hardware components communicatively connected to one another, whereas in another embodiment, they may comprise a single hardware solution wherein the web application server 104 is a software or firmware component of the computer adapter 103.

The web application server 104 may serve and display the web interface upon the connected mobile user device 101 as an interactive graphical user interface permitting the user of the end user device 101 to select scoreboard commands to be issued. In an embodiment, the user may select one or more displays or portions of an overall display via the interface based upon personal preference, mobile user device type, scoreboard make and model, and the like. For example, the web application server 104, based upon user-selected and/or stored preferences, may generate a proxy display of or otherwise associated with a scoreboard layout, whereby a user can tap or click on each of one or more scoreboard elements to modify the values displayed. Alternatively, the web application server 104 may display a representation of a traditional scoreboard controller, wherein the user can select and adjust settings using for example up and down icons or toggle buttons, etc.

When the user issues a scoreboard command via the end user device 101, the scoreboard computer adapter 103 determines the associated performative action for the command. Commands may include, for example, software administration functions, user administration functions, preference functions, and scorekeeping functions. In an embodiment, the scoreboard computer adapter 103 may comprise a software-enabled scorekeeping engine 105 operating in conjunction with, or alternatively integrated into, or alternatively running as a separate process from, the web application server 104. In said embodiment, the scorekeeping engine 105 may determine an associated performative scoring action for the scorekeeping functions that the user issued via the web interface. For scorekeeping command functions, such as for sending data to or updating data on a scoreboard display 106 communicatively connected to the scoreboard computer adapter 103, the scorekeeping engine 105 determines the associated output for the performative command based upon at least the make and model of the connected scoreboard display 106 and issues the command output to the scoreboard display 106. For example, a user may select an option to pause the countdown clock on the web interface, whereupon the scorekeeping engine 105 determines the appropriate command for the connected scoreboard display 106, such as, for example, by looking up in a database on the scoreboard computer adapter 103 the associated output command for "PAUSE CLOCK," and then issues via the scoreboard computer adapter 103 the output command to the connected scoreboard display 106. In this manner, one or more users may control the connected scoreboard display 106 wirelessly via one or more mobile user devices 101, regardless of any proprietary input-output hardware or commands traditionally associated with the scoreboard display 106.

In various embodiments, the scoreboard computer adapter 103 may comprise a virtual software scoreboard function 107 in association with the scorekeeping engine 105. The software scoreboard 107 may be updated in conjunction with the connected scoreboard display 106 and subsequently mirror the display's values. In certain embodiments, the software scoreboard 107 may be machine readable by other connected computer systems, such as, for example, Internet-connected web servers for displaying scoreboard information for Internet-connected viewers, and other scoreboards or scoreboard components.

In an embodiment, the scoreboard computer adapter 103 may be further enabled to communicatively connect to additional scoring hardware such as goal sensors or referee control units and automatically or programmatically issue associated command actions the scorekeeping engine 105. For example, a goal sensor may automatically detect when a goal has been made, causing the scorekeeping engine 105 to update the scoreboard display 106 and virtual software scoreboard 107 accordingly. In an alternative embodiment, the scorekeeping engine 105 may, via the web application server 104 generate a notification via the web interface upon the one or more connected mobile user devices 101.

Referring now to FIG. 2, an exemplary embodiment of a method 200 as disclosed herein may begin at a first step 201 wherein a user initiates a wireless connection to a scoreboard adapter system via a mobile device. In one embodiment, the wireless connection may be via Bluetooth protocol. In an embodiment, the user may be prompted to verify the connection via a mobile application by performing an interface action such as, for example, swiping a finger across a screen, or, as another example, entering a passcode. In step 202, the system authenticates the validity of the mobile device's access rights. In one embodiment, the system may determine the user's access rights based on the provision of a username and password, RSA token, or other user-provided credentials. In another embodiment, the system may automatically determine access rights based upon the MAC address of the connecting device.

In yet another embodiment, the system may prompt the user to perform an action such as scanning a QR code or NFC tag to validate the device. Alternatively, the user may initiate the wireless connection to the scoreboard adapter system by scanning a QR code or NFC tag, wherein the end user device obtains a token for authenticating access rights for the particular scoreboard or any one or more scoreboards at a particular venue.

If the mobile device is authenticated, then the system displays an interactive web application on the mobile device (step 203). The web application display may be configured for display based upon the connecting user's access credentials, such as, for example, access privileges or user settings. In another embodiment, the display may be based upon stored configuration settings pertaining to the connected scoreboard. For example, if the system is connected to a bingo scoreboard, a first display may be generated, whereas if the system is connected to a baseball scoreboard, a second display may be generated, wherein each display is configured for interaction with the specific scoreboard type and/or make and model.

In various embodiments, displays may be further based upon user settings directing the presence, size, and/or arrangement of controls; and/or colors, graphics, and other cosmetic settings. Displays may also be based upon user authorizations. For example, a user may be authorized based on user settings, account creation settings, prior user limitation, etc., to operate only a subset of controls or to issue a subset of commands for the scoreboard. In such instances, users may be limited from seeing or interacting with controls or commands that exceed their authorization. For example, representations of buttons may not appear or may be grayed or faded out and non-responsive to user input. Additional non-scoreboard features may also be presented, such as messaging options for other users, diagnostic controls, settings, user account information, and the like.

In step 204, the user selects a command via the interactive web application. The system then determines the associated command from the system's command database (step 205), executes the command function via associated software instructions (step 206), and updates the web application display in accordance with the selected command and instructions thereof (step 207). For example, a user may select various administrative options such as adding or deleting authorized users and/or mobile devices; changing the connected scoreboard type, make, or model; changing web application display preferences; selecting menu features; and the like. The system performs the various updates and updates the web application display on the mobile device accordingly.

If the user in step 204 selects a scorekeeping command, then the system, in addition to updating the web application interface, references the appropriate score command output for the connected scoreboard display from the system database (step 208) and outputs the score command to the connected scoreboard display (step 209). In an embodiment, the system may further perform steps 208 and 209 in conjunction with steps 205 through 207, update a software scoreboard in accordance with the same issued command, wherein the software scoreboard and scoreboard display maintain the same information based upon the same issued user commands (step 210). In an embodiment, the web application display may be populated with information stored within the software scoreboard.

In one embodiment for a stat board, a user may be able to, via one or more iterations of method 200, enter in player information into a roster and save one or more rosters to the system, such as by typing and saving a player name and number. The user may then select a player and, adjust player information (e.g. on court, benched, fouls, and points) via the web application interface wherein scorekeeping commands result in simultaneous updates to the connected scoreboard display.

FIG. 3 describes a user authentication method 300, beginning at a first step 301 when a user confirms his or her location by obtaining or otherwise receiving and verifying a location token uniquely associated with a scoreboard. Method 300 may further describe step 202 and, in some embodiments, subsequent steps of method 200. In certain embodiments, a user may scan a QR code, bar code, or similar optical code uniquely associated with a scoreboard, the code existing proximate to or printed on the scoreboard. For example, the user may scan a QR code which instructs the user's mobile device via a URL to open a browser window and link to an associated login page for the associated scoreboard. In another embodiment, the user may enter a unique password associated with the scoreboard. The password may be controlled and set and reset periodically by the venue owning the scoreboard, whereby such password may serve in various embodiments as both a location token and an identity token. For example, a unique password for a specific period of time (e.g., associated with one game) may be generated and delivered automatically to a previously authenticated user (or several in a group of possible authenticated users) via SMS, email or the like. Such a password may serve as an identity token to be combined for example with additional information from the end user device as a location token to comprehensively authenticate the user for web platform access rights.

In one embodiment, the verification of the location token may initiate the user's connection to the web platform of the associated scoreboard, such as when a user scans a QR code for launching a browser with instructions to connect to a web portal. In other embodiments, the user may launch the web portal and/or connect to the web platform before submitting the location token. In such other embodiments, the user may submit a location token in the form of a temporarily generated code. For example, the web platform may display on the associated scoreboard a temporary authentication code which the user must submit via his mobile device, e.g. by entering a code or submitting a picture of a code or the scoreboard display configuration as proof of the user's physical presence at the scoreboard site.

In alternative embodiments to code scanning, the user may confirm his or her location via the user mobile device's location services such as GPS coordinate determination; detection of Wi-Fi, iBeacon, Bluetooth, or other broadcast protocol; cellular tower triangulation; and the like. In such embodiments where more than one scoreboard may be within the same geographical boundaries, frequency broadcast range, and/or geo-gate, the user may further be required to specify a specific scoreboard to which the user is attempting to connect. For example, the detection of an iBeacon may prompt the user device to launch a browser window where the user may select from a plurality of scoreboards the intended match. The detection event may require the user to perform one or more forms of additional verification action, such as scanning a code, entering a location password, taking a picture of the intended display unit, or other such actions sufficient to provide the mobile device enough information to determine a specific scoreboard.

In an embodiment, a plurality of end user devices may be within a specified broadcast range of a location-based token generator, wherein any one or more predefined or otherwise authenticated users may be prompted to ask if they wish to initiate connection to the web platform.

Upon determination of the location token and the associated scoreboard, the user's mobile device then displays a web-based portal for the user prompting the user to log in and/or provide the user's verification credentials (step 302). For example, the portal may prompt the user for a username and password, a fingerprint verification, a MAC address, a unique device identifier (UDI), etc. In step 303, the system (e.g. the web application server) compares the user's verification credentials against known credentials to determine if the user is authorized. In one embodiment, the system may compare the user's credentials against a database of authorized users. In another embodiment, the system may prompt the venue or another authorized user for confirmation to verify the user attempting to log in. Such a prompt may be the authorization process of step 303, or, in other embodiments, may serve as an additional factor of authentication. If the user is not authorized, the system does not permit the user to connect and may prompt the user to try the verification process again. Otherwise, if the user is authorized, the system proceeds to the next step.

In step 304, the system determines whether there is already an authorized user who is connected to the scoreboard (i.e. in an active session). If there is a prior user in an active session with the scoreboard, the system may perform any one or more of the following steps based upon (a) programmatic settings, (b) venue-defined settings, (c) and/or authorized user settings: the system may deny the newly authorized user access until the prior user ends his active session (step 305); the system may notify the prior user of the new user's login attempt and prompt whether the prior user wishes to end his or her session to allow the new user to engage in an active session (step 306); and/or the system may prompt whether the prior user wishes to allow the new user to connect to the present active session (step 307).

In various embodiments of step 305, the system may notify the new user when the prior user's active session has expired, e.g. via push notification. The system may further queue authorized users based on priority factors such as time of login, account seniority, connectivity strength, etc. In embodiments of step 306, the system may automatically terminate the prior user's active session if no confirmation is received within a certain timeframe. The system may permit the prior user to extend his or her active session for a duration of time before automatically expiring. In various embodiments, the system may further determine user priority and/or active session duration based upon information from the scoreboard. For example, the system may automatically terminate active sessions of users after X number of minutes following the scoreboard clock reaching "zero" (or maximum time) in the final period. The system may also prompt verified users within proximate range (e.g. via push notification) when a session is expired, or a new session is set to begin. For example, the system may prompt coaches and/or parents of a little league team when a game is set to begin whether said users would like to log in as authorized users and issue commands to the scoreboard via the system.

In embodiments of step 307, the prior user may allow the new user to operate the scoreboard simultaneously, whereby two or more users collaborate on access and control. In another embodiment, the prior user and/or new user may select a subset of actions for which each user will be uniquely authorized. For example, a prior user may retain control over scoring and timing functions, whereas one or more subsequent users may be permitted control over team substitution and fouling information. As another example, one user may control the scoreboard scoring information whereas another user may control informational graphics, advertising, sponsorship displays, and the like.

If no prior user is engaged in an active session, or if such prior user permits the new user to replace or join the prior user (i.e. steps 306, 307), then the user is authorized to create or join an active session, respectively, and the system determines which scoreboard controller to which the user is connecting and which scoreboard display to present on the user's mobile device (step 308). The system may determine the display type based upon the location token or the UID of the scoreboard. For example, the scoreboard controller may retain the make and model of the associated scoreboard and cue a digital rendering of a controller for that scoreboard as the display upon the user's mobile device. In further embodiments, the system may further render the scoreboard as the display upon the user's mobile device based upon the user's set preferences. For example, the user may modify the position or size of certain controls, may elect to hide or show certain features, or may render the scoreboard in specific colors or graphics, e.g. in the trade dress of a particular team. Once the user has been authorized and the display rendered, the system then waits to receive instructions from the authorized user via the mobile device and issues those instructions until such time that the user's active session is terminated (step 309).

The previous detailed description has been provided for the purposes of illustration and description. Thus, although there have been described particular embodiments of an invention, it is not intended that such references be construed as limitations upon the scope of this invention except as set forth in the following claims.

We claim:

1. An electronic scoreboard control system comprising:
   a scoreboard computer adapter in operable association with at least one scoreboard having at least one display and associated with a particular venue, the scoreboard computer adapter broadcasting a local communications network enabled to only cover a geographic area of the venue;
   wherein the scoreboard computer adapter is capable of selectively operable association with a plurality of scoreboards and a plurality of displays concurrently;
   the scoreboard computer adapter including a web app server and a scorekeeping engine;
   the web app server configured to:
      receive an authentication request from an end user computing device communicatively coupleable to the scoreboard computer adapter via the local communications network, the authentication request comprising a user authentication credential and user location data;
      authenticate access of the end user computing device to the at least one scoreboard or the at least one display based on the user authentication credential and the user location data;
   the web app server configured to create, serve, and display a scalable and interactive web interface accessible to the end user computing device, upon authenticating the end user computing device to the at least one scoreboard or the at least one display;
   the interface enabling the end user computing device to select scoreboard commands displayed in the interface and transmitting the selected scoreboard commands to the scorekeeping engine;
   wherein the scorekeeping engine is configured responsive to the transmitted scoreboard commands to direct updating of the at least one scoreboard or the at least one display in accordance with the respective scoreboard commands by transmitting output commands to the at least one scoreboard or the at least one display;
   wherein the web app server is configured to generate a specific interface for the end user computing device that is customized with respect to a predetermined set or subset of commands available for the specified scoreboard;
   wherein the electronic scoreboard control system determines the specified scoreboard based upon the user location data of the end user computing device;
   wherein the scorekeeping engine determines the output command associated with the display based upon the model of the display; and
   proprietary software is not implemented on the end user computing device, thereby enabling any end user computing device enabled to only connect to the local communications network to operate the display via the interface.

2. The electronic scoreboard control system of claim 1, wherein the interface for the end user computing device comprises limited access to one or more of the predetermined set or subset of commands based on the scoreboard configuration;
   the web app server storing a plurality of access profiles, each access profile associated with the predetermined set or subset of commands for the specified scoreboard;
   determining, based on the user authentication credential, an access profile corresponding to the user authentication credential for the end user computer device; and
   providing the end user computing device access to the predetermined set or subset of commands associated with the determined access profile.

3. The electronic scoreboard control system of claim 1, wherein the web app server is configured to generate a first interface for a first end user computing device and a second interface for a second end user computing device, and the first and second interfaces are respectively customized for first and second sets of commands available for the specified scoreboard.

4. The electronic scoreboard control system of claim 1, wherein the scoreboard computer adapter comprises a processor and memory residing in a housing for the scoreboard and in operative association with the scoreboard display.

5. The electronic scoreboard control system of claim 1, wherein the web app server adapter is configured to deliver messages, via the local communications network to at least one end user computing device of at least one or more defined users, prompting each of the one or more defined users to submit the authentication request for access to the user interface.

6. The electronic scoreboard control system of claim 1, wherein the interface generates a graphic display of a scoreboard control layout, wherein the user manipulates each of one or more scoreboard control elements to generate commands that modify values displayed on the display.

7. The electronic scoreboard control system of claim 6, wherein scoreboard control elements are representations of up and down icons or toggle buttons.

8. A method for controlling at least one display of at least one electronic scoreboard, comprising:
- generating and broadcasting a local communications network, by a scoreboard computer adapter, the scoreboard computer adapter including a web app server and a scorekeeping engine;
- connecting at least one end user computing device to only the local communication network, wherein no proprietary software is implemented on the end user computing device, thereby enabling any end user computing device enabled to only connect to the local communications network to operate the at least one display via the interface;
- receiving an authentication request from the at least one end user computing device, the authentication request comprising a user authentication credential and user location data;
- authenticating the at least one end user computing device via the web app server based on the user authentication credential and the user location data;
- generating a scalable and interactive web interface at the web app server accessed by the at least one end user computing device, the interface enabled to be customized with respect to a profile of the at least one electronic scoreboard and proprietary software is not implemented on the end user computing device, thereby enabling any end user computing device enabled to only connect to the local communications network to operate the at least one display via the interface;
- enabling selection of scoreboard commands at the interface from the user computing device;
- transmitting the selected scoreboard commands to the scorekeeping engine for determining an associated output command by the scorekeeping engine based upon the model of the at least one display;
- directing real-time updates of the at least one display by the associated output command of the scorekeeping engine in accordance with the scoreboard commands;
- automatically generating output signals from one or more sensors that are representative of a scoring increment trigger, receiving the signals at the computer adaptor; and
- automatically or programmatically updating the scoreboard display or selectively generating a notification to the end user computing device, prompting the end user computing device for authentication, via the interface, of an update to the scoreboard display based on the output signals.

9. The method of claim 8, further comprising:
- electronically delivering one or more messages to one or more end user computing devices of one or more defined users with respect to the specified scoreboard, prompting each of the one or more defined users to submit the authentication request for access to the local communications network.

10. An electronic scoreboard control system comprising:
- a scoreboard computer adapter in operable association with a scoreboard having a display and associated with a particular venue, the scoreboard computer adapter broadcasting a local communications network enabled to only cover a geographic area of the venue;
- an interface created by the scoreboard computer adapter, accessible to an end user computing device communicatively coupleable to the scoreboard computer adapter via the local communications network, upon authenticating the end user computing device to the scoreboard, the interface enabling the end user computing device to select scoreboard commands displayed in the interface transmitting the commands to the scoreboard computer adapter;
- wherein the scoreboard computer adapter is further configured responsive to the transmitted scoreboard commands to direct updating of the display in accordance with the respective scoreboard commands and proprietary software is not implemented on the end user computing device, thereby enabling any end user computing device enabled to only connect to the local communications network to operate the display via the interface;
- wherein the electronic scoreboard control system further comprises one or more sensors communicatively linked to the scoreboard computer adapter and configured to detect the presence of a scoring event and, upon detection of a scoring event, to automatically generate one or more output signals representative of at least one scoring increment trigger;
- wherein upon receipt of the at least one scoring increment trigger, the scoreboard computer adapter is configured to automatically or programmatically update the display; and
- wherein upon receipt of the at least one scoring increment trigger, the scoreboard computer adapter is further configured to selectively generate a notification to the end user computing device, prompting the end user computing device, via the interface, for authentication of an update to the display.

* * * * *